United States Patent [19]
Haller et al.

[11] Patent Number: 6,004,832
[45] Date of Patent: Dec. 21, 1999

[54] METHOD OF FABRICATING AN ELECTROSTATIC ULTRASONIC TRANSDUCER

[75] Inventors: Matthew Isaac Haller, Mountain View; Butrus Thomas Khuri-Yakub, Palo Alto, both of Calif.

[73] Assignee: The Board of Trustees of the Leland Stanford Junior University, Palo Alto, Calif.

[21] Appl. No.: 08/792,114

[22] Filed: Jan. 31, 1997

Related U.S. Application Data

[62] Division of application No. 08/327,210, Oct. 21, 1994, Pat. No. 5,619,476.

[51] Int. Cl.$^6$ .................................................. H01L 21/00
[52] U.S. Cl. .............................. 438/50; 438/53; 438/48; 216/2; 73/777; 73/514.16
[58] Field of Search ................... 438/50, 53, 48; 216/2; 73/777, 514.16, 754; 148/DIG. 12, DIG. 159

[56] References Cited

U.S. PATENT DOCUMENTS

| | | |
|---|---|---|
| 4,262,399 | 4/1981 | Cady . |
| 4,432,007 | 2/1984 | Cady ........................................... 357/26 |
| 4,566,935 | 1/1986 | Hornbeck ................................. 156/626 |
| 4,665,610 | 5/1987 | Barth ........................................... 29/580 |
| 4,783,821 | 11/1988 | Muller et al. ............................. 381/173 |
| 4,910,840 | 3/1990 | Sprenkels et al. . |
| 5,013,693 | 5/1991 | Gucket et al. ........................... 437/248 |
| 5,285,131 | 2/1994 | Muller et al. ............................. 313/578 |
| 5,367,429 | 11/1994 | Tsuchitani et al. ...................... 361/280 |
| 5,408,731 | 4/1995 | Berggvist . |
| 5,436,452 | 7/1995 | Kenny et al. ......................... 250/338.1 |
| 5,459,610 | 10/1995 | Bloom et al. ............................ 359/572 |
| 5,633,552 | 5/1997 | Lee et al. .................................. 310/311 |

Primary Examiner—Charles Bowers
Assistant Examiner—Sam Lee
Attorney, Agent, or Firm—Flehr Hohbach Test Albritton & Herbert LLP

[57] ABSTRACT

A method of fabrication wherein a nitride layer is spaced from a conductive substrate by an insulating layer and etching removes at least portions of an insulating layer to leave a nitride membrane spaced from the substrate. The surface of the conductive layer where the insulating layer is removed is chemically roughened and the etchant is removed by freeze-drying and sublimation to eliminate sticking of the nitride layer to the substrate surface during fabrication.

1 Claim, 7 Drawing Sheets

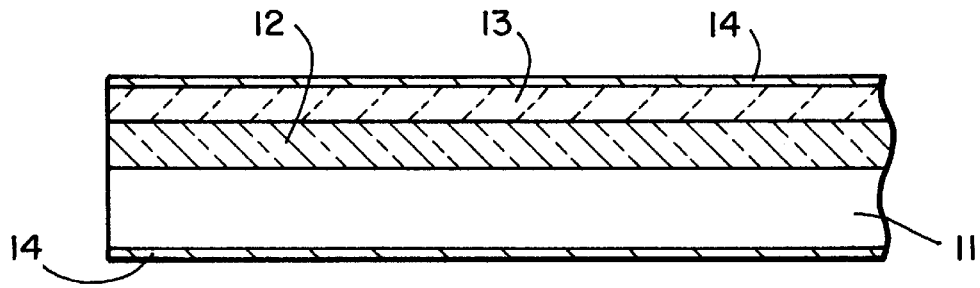
FIG_1A
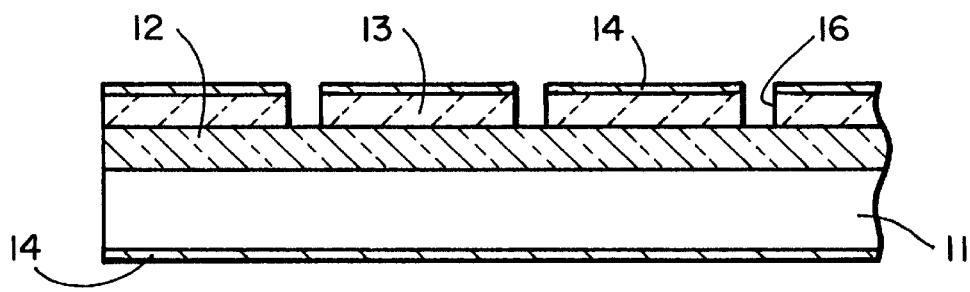
FIG_1B
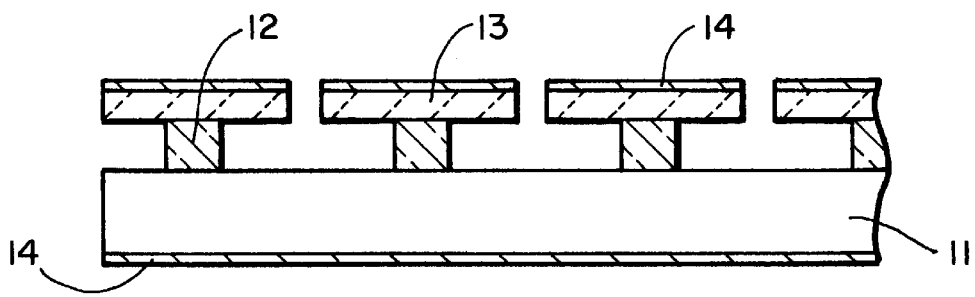
FIG_1C
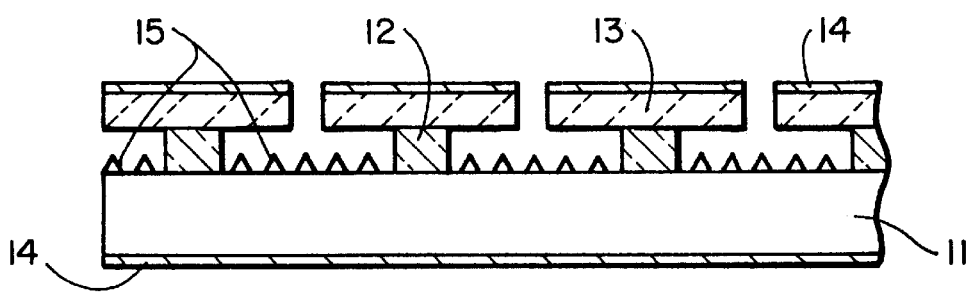
FIG_1D

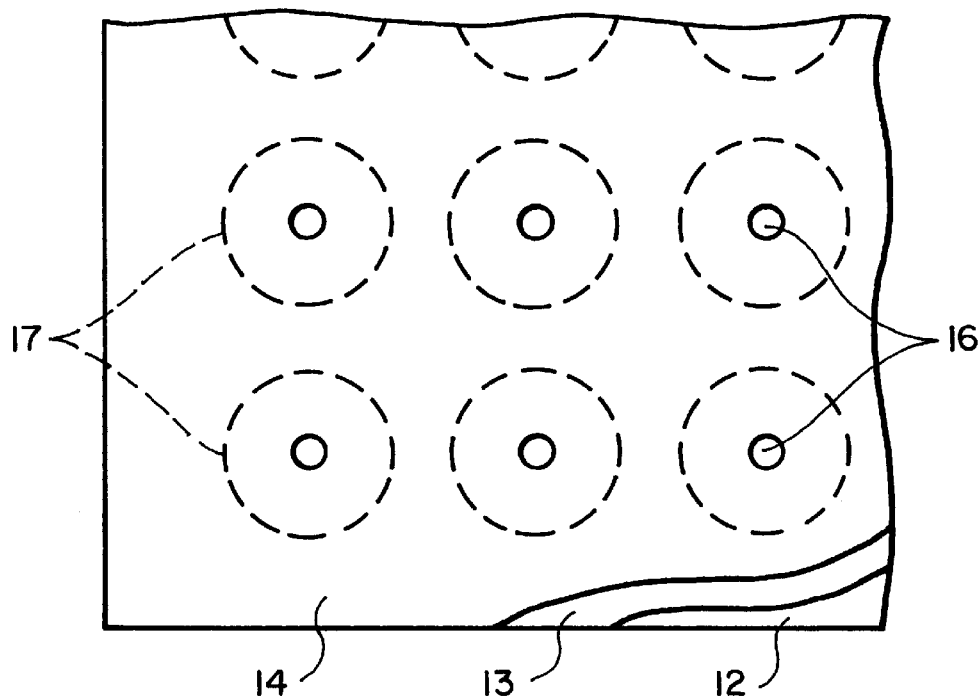
FIG_2
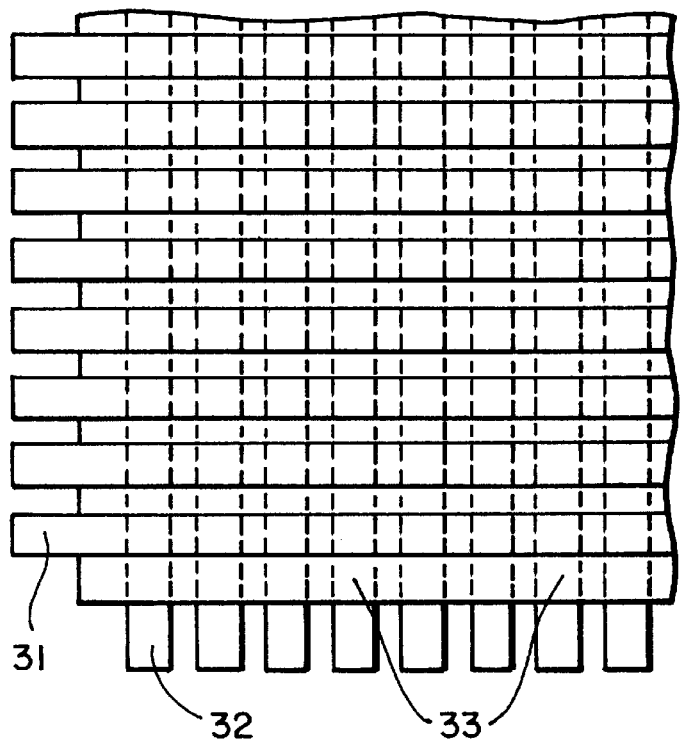
FIG_3

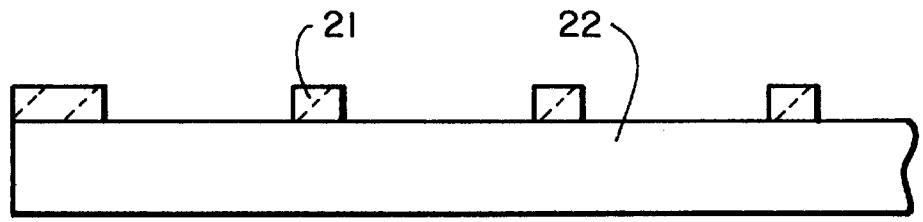
FIG_4A
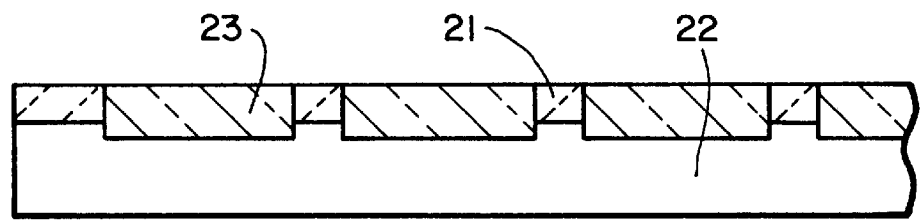
FIG_4B
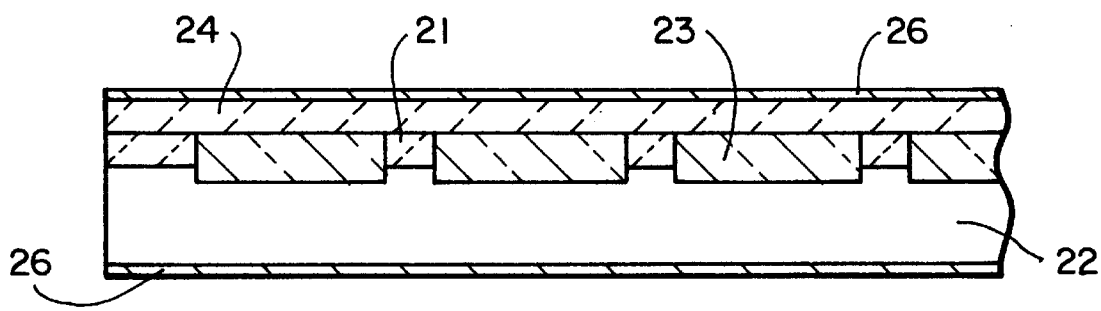
FIG_4C
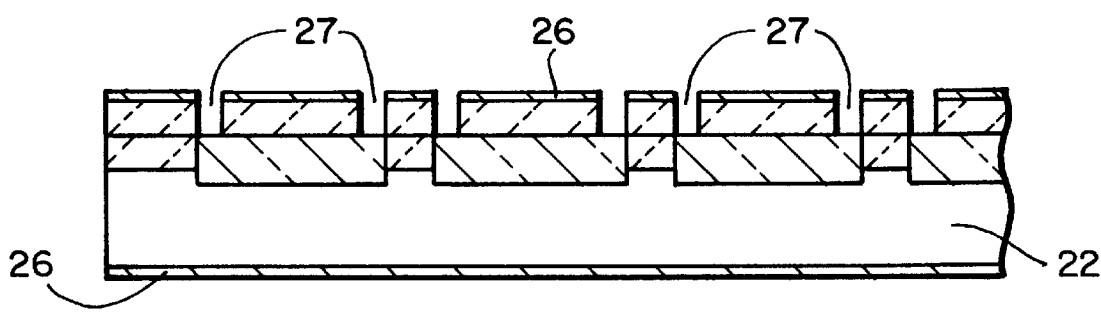
FIG_4D

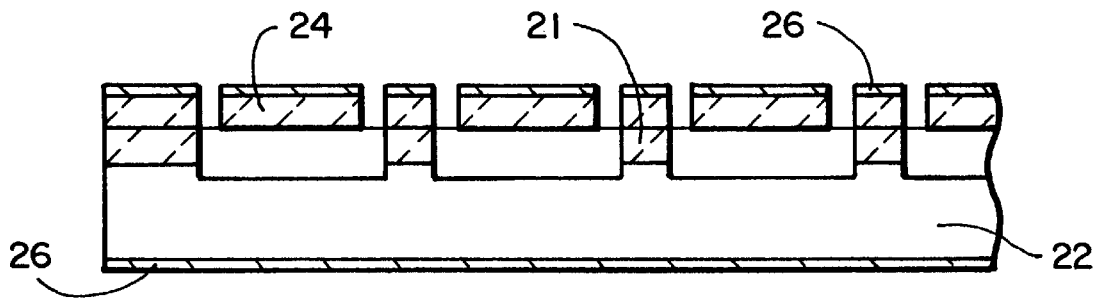
FIG_4E
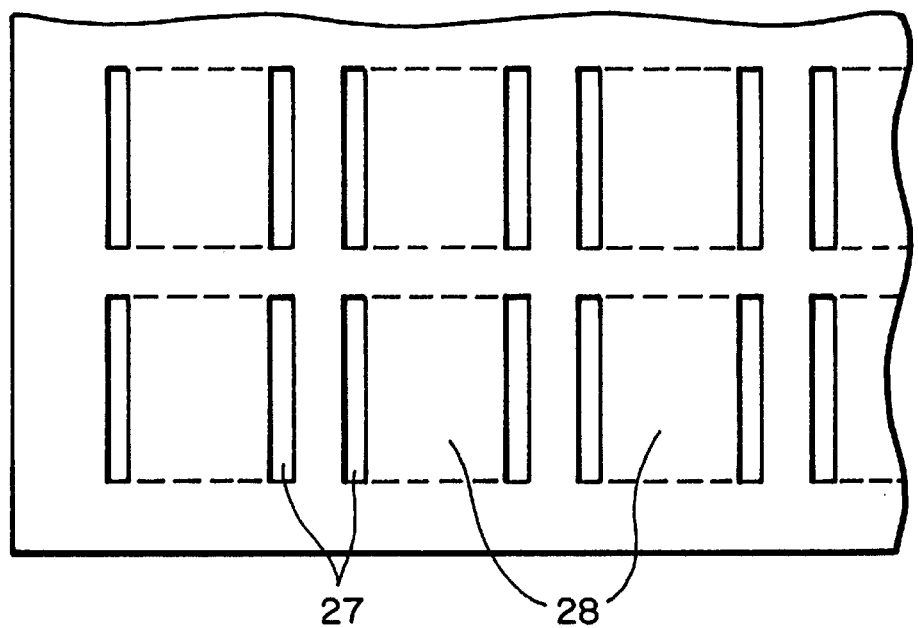
FIG_5
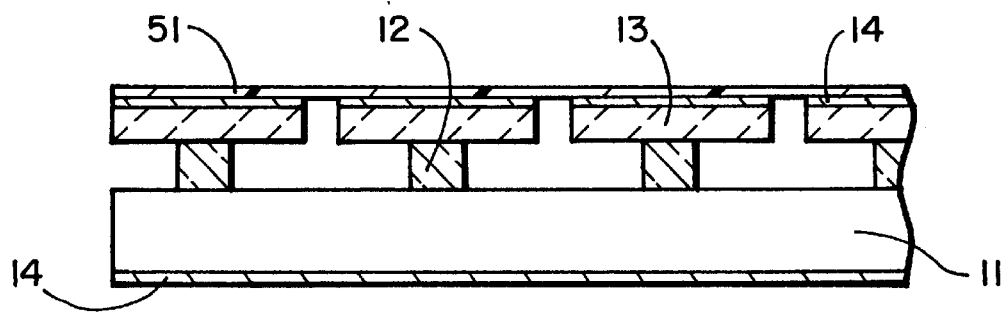
FIG_7

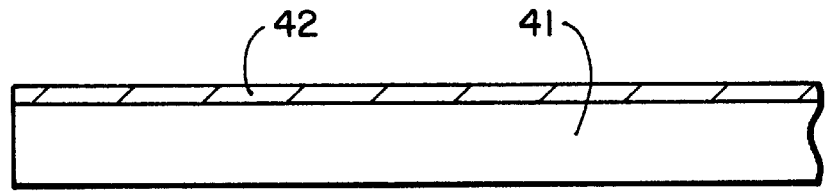
FIG_6A
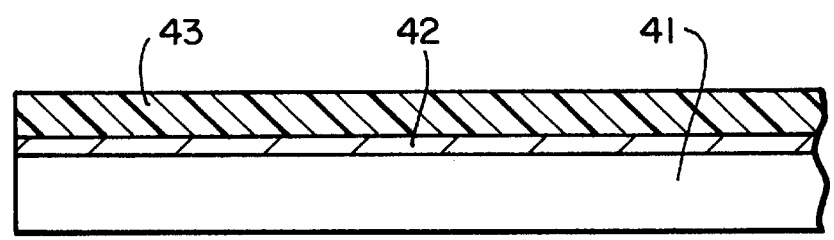
FIG_6B
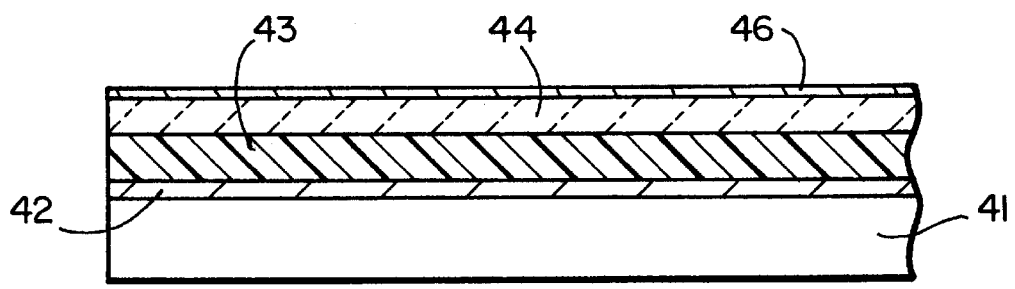
FIG_6C
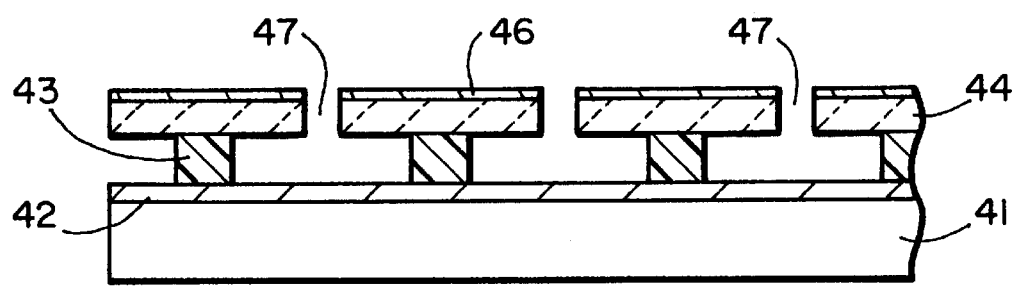
FIG_6D

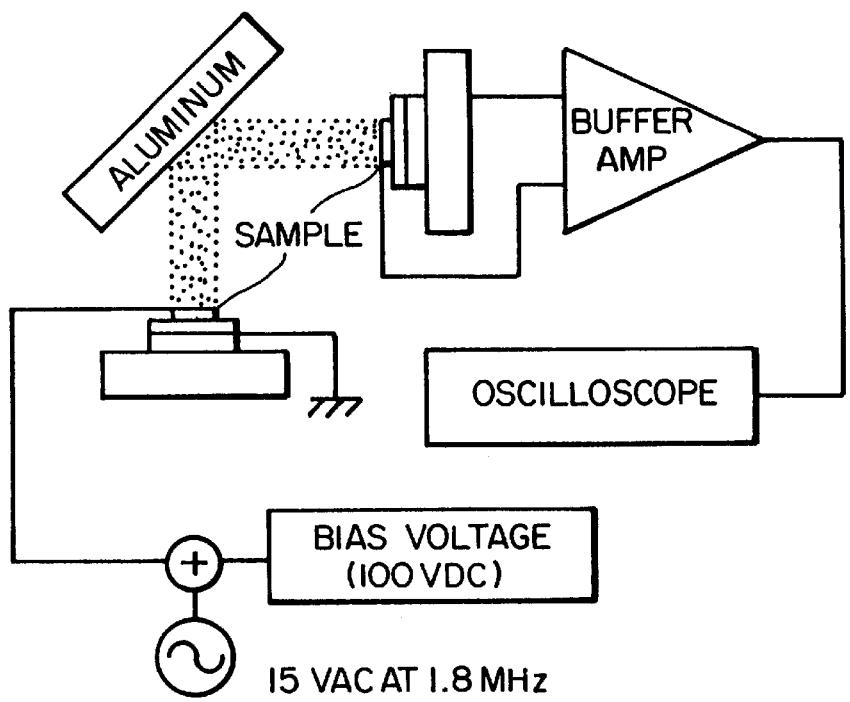
FIG_8
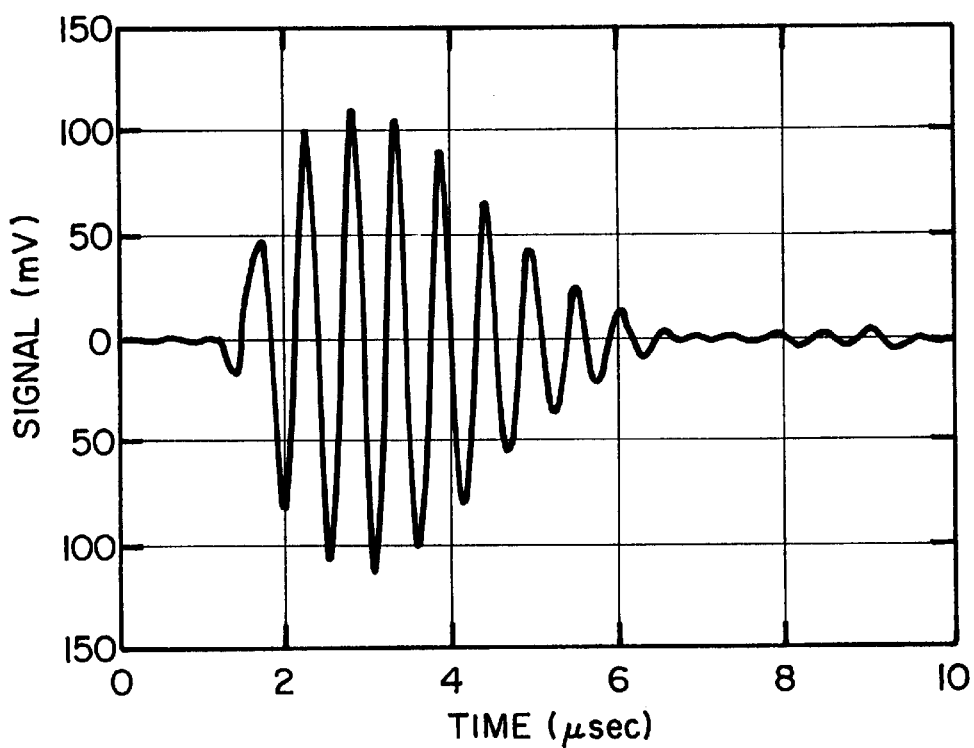
FIG_9

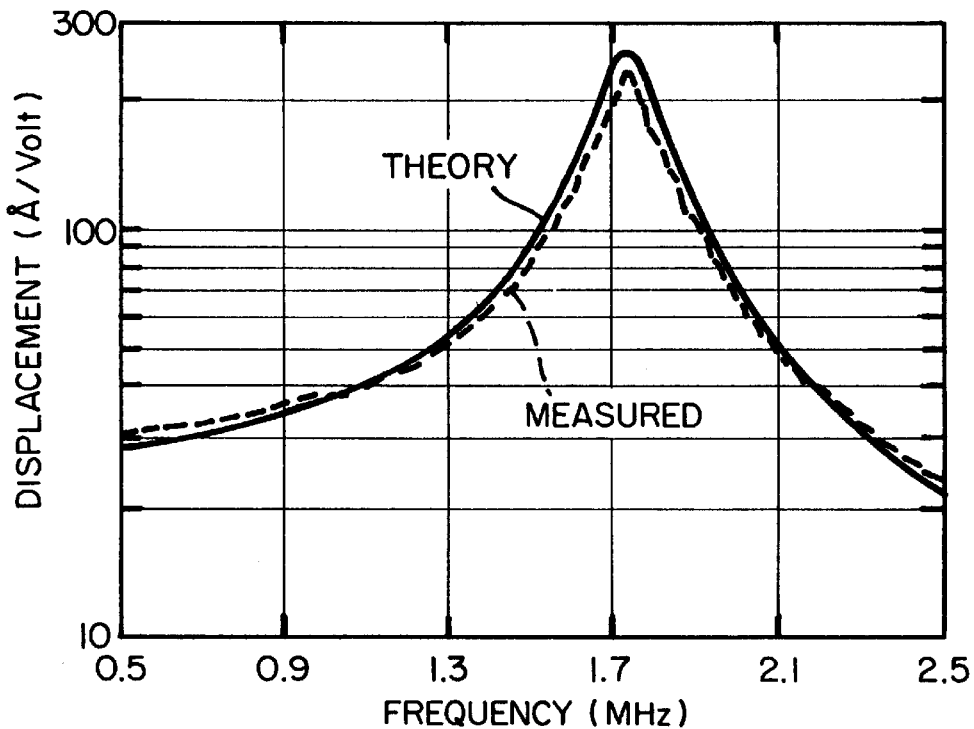
FIG_10
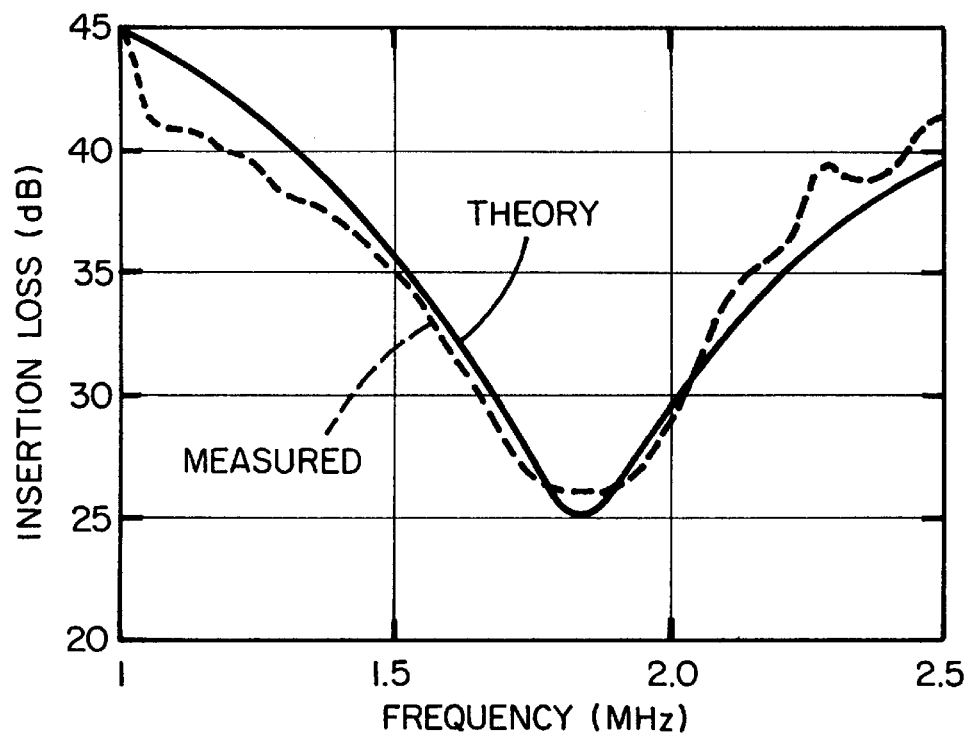
FIG_11

METHOD OF FABRICATING AN ELECTROSTATIC ULTRASONIC TRANSDUCER

This is a division, of application Ser. No. 08/327,210 filed Oct. 21, 1994 U.S. Pat. No. 5,619,476.

FIELD OF THE INVENTION

This invention relates generally to electrostatic ultrasonic transducers and to a method of fabricating the transducers and, more particularly, to electrostatic ultrasonic air transducers and methods of fabrication.

BACKGROUND OF THE INVENTION

Ultrasonic transducers operating into liquids, solids and gas have found many applications in signal processing devices such as delay lines, resonators, convolvers and correlators, and in systems for medical imaging, non-destructive evaluation, and underwater sensing.

The generation of ultrasound in air is of interest for a variety of applications including robotic distance sensing and imaging, gas flow measurements, in-situ process monitoring and acoustic microscopy. To achieve maximum resolution, it is necessary to operate at the highest possible frequency. This is limited by the attenuation of sound waves in air which is about 1.2 dB/cm at 1 MHz, and increases as the square of the frequency. Of particular interest is operation in the 200 kHz to 10 MHz frequency range.

Conventional techniques to generate sound at these frequencies use a piezoelectric material (typically lead-zirconium-titanate). These piezoelectric materials have an acoustic impedance of approximately 35 MRayls (kg/m$^2$s), while air has an impedance of 0.0004 MRayls. Thus, there is an impedance mismatch of 5 orders of magnitude. This results in extremely poor efficiency and bandwidth. In practice, one or more quarter-wave layers of material are used to match the impedance of the piezoelectric material to air. Because of the low bandwidth, prior art transducers are very dependent on the attenuation of the matching layer. Materials for matching layers which have the right acoustic impedance, low attenuation and are easy to work with are not available. Thus, efficient high-frequency ultrasonic air transducers are not available.

Electrostatic transducers have been used for transmitting, emitting and receiving acoustic energy. For example, electrostatic transducers have long been used for audio speakers and capacitance receivers. Large-area electrostatic transducer arrays have been used for acoustic imaging. Electrostatic transducers work on the principle of electrostatic attraction between the plates of a capacitor. The attractive force is proportional to the square of the electric field. As the plates are moved by the application of an electrical signal, they generate sound at that frequency. When sound is received by the transducer, it can be used to generate a corresponding electrical signal.

Electrostatic transducers have also been used for ultrasonic application. Electrostatic ultrasonic sources have typically relied on roughening the surface of a metal plate and bonding a thin metalized dielectric to the plate. The microscopic grooves in the plate act as resonators and determine the frequency response of the transducer. These devices are not easily characterized and their fabrication is more art than science.

There is a need to provide electrostatic transducers which can efficiently generate and receive ultrasound in air over a broad band of frequencies.

OBJECTS AND SUMMARY OF THE INVENTION

It is a general object of this invention to provide a method of manufacturing ultrasonic transducers.

It is another object of the invention to provide a method of manufacturing an electrostatic ultrasonic transducer which can efficiently generate broad band ultrasound in air.

It is yet another object to provide a method of forming an ultrasonic transducer and transducer arrays by micromachining.

It is yet another object of the invention to provide a method of fabrication wherein a nitride layer is spaced from a conductive substrate by an insulating layer and etching removing at least portions of an insulating layer to leave a nitride membrane spaced from the substrate. The surface of the conductive layer where the insulating layer is removed are chemically roughened and the etchant are removed by freeze-drying and sublimation to eliminate sticking of the nitride layer to the substrate surface during fabrication

BRIEF DESCRIPTION OF THE DRAWINGS

The foregoing and other objects of the invention will be more clearly understood from the following detailed description when read in conjunction with the accompanying drawings, wherein:

FIGS. 1A, 1B, 1C, and 1D illustrate one method of fabricating a transducer in accordance with this invention;

FIG. 2 is a top plan view of a transducer formed in accordance with the method illustrated in FIGS. 1A–1C;

FIG. 3 shows a transducer array employing transducers fabricated in accordance with this invention;

FIGS. 4A, 4B, 4C, 4D and 4E illustrate another method of fabricating a transducer in accordance with the invention;

FIG. 5 is a top plan view of a transducer formed in accordance with the method illustrated in FIGS. 4A–4E;

FIGS. 6A, 6B, 6C and 6D show another method of forming a device in accordance with this invention;

FIG. 7 shows a transducer in accordance with this invention;

FIG. 8 is a schematic diagram of a system used to test devices fabricated in accordance with this invention;

FIG. 9 shows the acoustic impulse response of a 100 µm period device;

FIG. 10 shows the peak displacement of a 100 µm period device with 100 VDC bias;

FIG. 11 shows the acoustic power in air measured acoustically with a laser interferometer and theory with 100 VDC, 1 VAC.

DESCRIPTION OF PREFERRED EMBODIMENTS

Operation of an electrostatic transducer fabricated in accordance with this invention will be better understood after processes for fabricating the transducer have been described. A first process of fabricating a transducer in accordance with this invention will be described with reference to FIGS. 1A–1C. The first step is to start with a highly doped, <100> polished silicon wafer 11 which serves as the substrate. The next steps are to grow a 10,000 Å layer of thermal oxide 12 followed by the deposition of a 7500 Å thick layer of low stress LPCVD silicon nitride 13. This nitride has a measured residual stress of 280 MPas[6]. This value can be adjusted by varying the proportion of silane to ammonia during the deposition stage. The backside of the wafer is stripped of these layers, and a 500 Å film of gold 14 is evaporated onto both sides of the wafer. The resulting structure is shown in FIG. 1A. A resist pattern of 3 μm diameter dots on a 2 dimensional grid with 100 μm period is transferred lithographically to the wafer. The gold and the nitride are etched through the holes by using a suitable chemical etch for the gold and a plasma etch for the nitride. The resulting structure is shown in FIG. 1B. The holes 16 provide access to the silicon dioxide, which acts as a sacrificial layer. The wafer is then diced to 1 cm×1 cm square samples for ease of handling. The sacrificial layer is then etched away by pure hydrofluoric acid during a timed etch. This leaves portions of the thermal oxide layer supporting the silicon nitride. The size of the unsupported silicon nitride membrane is controlled by the etch time. However, if processing were terminated at this point, the surface tension between the liquid etchant and the silicon nitride layer 13, FIG. 1C, would pull the nitride membrane (or layer 13) down as the etchant is removed. Once the nitride and silicon are in contact, VanderWals forces would hold the membrane to the silicon substrate and the device would no longer function.

Two different techniques were employed to prevent this from occurring. The first step used was a chemical roughening of the silicon surface. This reduces the surface area to which the membrane was exposed and thus, reduces the VanderWals force holding the membrane down. The chemical etchant used is potassium hydroxide (5% at 20° C.) and is anisotropic silicon etchant. After twenty minutes of etching, pyramidal posts are left on the silicon surface, FIG. 1D. The faces of the pyramids are the <111> planes of the silicon. The second step used to prevent sticking is freeze-drying the structure. This results in the liquid etchant sublimating instead of evaporating.

After the structure has been fabricated, electrical contact is made to the gold layers on the front and back surfaces of the transducer. Thus, the transducer comprises a substrate 11 which forms one plate of a capacitor and a membrane including a nitride layer 13 and gold contact layer 14 forming the other parallel plate of the capacitor. The membrane is supported in this instance by the remaining thermal oxide 12. A top plan view of a portion of the transducer is shown in FIG. 2 with the circular membranes 17 supported by the unetched silicon oxide layer 12. The silicon nitride layer thicknesses, thin film stresses and membrane dimensions described above were chosen for a variety of reasons. One major consideration was the prevention of the membrane sticking to the substrate. To prevent the membrane from sticking we need to have a residual stress in the membrane 17. At the center of the membrane, with the membrane touching the silicon substrate, the force is proportional to:

$$Force \propto \frac{t_{oxide} t_{nitride} \sigma_0}{a^2} \quad (1)$$

This force is counter-balanced by the VanderWals force exerted between the membrane and the substrate which is proportional to the membrane area (or the square of the radius). The resonant frequency of the transducer is a function of the membrane radius, the residual stress and the density of the membrane. The electrostatic force increases as we decrease the oxide and nitride thicknesses. Thinner oxide and nitride layers provide larger electrostatic force, but increase the sticking problem. Compensation for this can be attempted by increasing the residual stress in the nitride. However, if the stress is increased more than approximately 1 GPa, the membrane will break. To improve the reliability of the process, a membrane stress of 280 MPas was chosen. Additionally, the peak displacement of the membrane will be limited by the oxide thickness. Thus, given these design considerations, the values stated earlier were chosen for the first transducer. Transducers with hole spacings of 50 μm and 25 μm were also fabricated and operated. One problem with micro-machined structures is their tendency to become contaminated when left open to the air. Water vapor, dust particles and other airborne contamination get into the small spaces and prevent the devices from working. Because the devices have a small (~3 μm) opening to the environment, this problem was not observed. The transducers were left open in a dirty lab environment for weeks with no sign of contamination. This is an important feature of these transducers for enabling them to be usable in airborne applications.

The fabrication technique discussed above is limited to making circular membranes. Membranes of arbitrary shapes can be fabricated by confining the sacrificial etch. This is done by isolating regions of silicon dioxide using silicon nitride ridges. Thus, the structure shape is not determined by a timed etch, but by lithography.

For demonstration purposes rectangular membranes were etched. The process flow for a confined etch fabrication is shown in FIGS. 4A–4E. The processing for the confined etch is similar to that of the timed etch except that there is a layer of silicon nitride 21 deposited on the substrate 22 to define the sacrificial regions. This nitride layer is 5500 Å thick. After the nitride is patterned into a two-dimensional grid 5 μm wide on 100 μm centers, FIG. 4A, 10,000 Å of thermal oxide 23 is grown, FIG. 4B. Because thermal oxidation consumes silicon, the silicon nitride and the silicon dioxide levels will be approximately the same for the nitride and oxide thicknesses chosen. Then a second layer 24 of silicon nitride is deposited. This layer will be the membrane layer. A cross-section of a wafer at this step is shown in FIG. 4C. A layer of gold 26 is then evaporated onto both sides of the wafer. Small, elongated openings 27 are formed in the manner described to allow the etchant to reach the silicon dioxide. The sacrificial etch removes all the silicon dioxide, leaving a structure as shown in FIG. 4E. FIGS. 4E and 5 depict the rectangular, defined regions where there is a nitride film supported by the patterned nitride 21 suspended above the sacrificial oxide. The silicon is roughened and the wafer is processed by freezing and sublimation. A transducer having rectangular diaphragms 28 is produced.

One advantage of the confined etch over the timed etch is that it allows devices to be made where a larger percentage of the surface area is a membrane, thus increasing the efficiency. Another advantage is the ability to make membranes of any shape. Annular arrays, well-defined "point" sources and transducer arrays become possible using confined etches.

An example of an array of transducers is shown in FIG. 3. A wafer of semiconductor material is processed in accordance with this invention to form a plurality of spaced membranes. For example, the wafer may be processed to form circular membranes with a 100 μm spacing. The thin gold contact layer is pattered to form a plurality of parallel strips 31 and 32 on the upper and lower surfaces to define an array of transducers. The area 33 where the strips cross defines a transducer. Depending on the width of the strips, the transducer will contain a large number of membranes. For example, if the strips are 1000 μm wide, the transducer will include 100 membranes. The strips are selectively energized to select one or more transducers. When the transducers are associated with appropriate delay lines, the array can be focused and the focused ultrasonic beam scanned. In the receive mode, the transducer can be focused to receive sound from a particular point.

The transducer can also be constructed using other types of sacrificial layers and substrates. Referring to FIGS. 6A–6D, a material such as glass may be used as the substrate 41. A layer 42 of conductive material such as aluminum is deposited on the surface of the glass. This is followed by forming a sacrificial layer 43 such as spinning a layer of polyimide on the surface of the aluminum. This is followed by forming a layer 44 of silicon nitride by plasma-enhanced chemical vapor deposition. This is followed by depositing a layer 46 of gold. Holes 47 are formed in the gold and silicon nitride layer in the manner previously described to expose the polyimide film or layer. This is followed by etching away a portion of the polyimide layer to leave a silicon nitride diaphragm supported by the polyimide.

In certain instances it is desired to use the transducers to excite ultrasound in fluids. In these instances, a thin polyimide film may be spun onto the surface of the device to close the holes or opinion. This is shown by the film 51 in FIG. 7.

Operation of the ultrasonic transducers of this invention will be more clearly understood from the following analysis, where the transducer is considered to be a parallel plate capacitor with the plates formed by the fixed substrate and membrane. If a voltage V is applied between the substrate and membrane, the membrane will experience an attractive electrostatic force of magnitude:

$$F = \frac{1}{2}\varepsilon A \frac{V^2}{d^2} \qquad (2)$$

where $\varepsilon$ is the dielectric constant of the material between the membrane and substrate, A is the membrane area, V is the voltage and d is the electrode spacing. Thus, by reducing the spacing (d), large forces can be generated. Because the force depends on the square of the voltage, the second harmonic of the applied voltage will be generated. For operation at the first harmonic, a dc bias $V_0$ is applied to the capacitor along with the r.f signal such that:

$$V(t) = V_0 + V_1 \cos(\omega t) \qquad (3)$$

The applied force will be:

$$F = \frac{\varepsilon A}{2d^2}[V_0^2 + 2V_0 V_1 \cos(\omega t) + V_1^2 \cos^2(\omega t)] \qquad (4)$$

By making the bias voltage much larger than the time varying voltage, the dominant time varying force becomes:

$$F = \frac{\varepsilon A}{d^2} V_0 V_1 \cos(\omega t) \qquad (5)$$

A good design requires a large displacement due to the applied force so that a large amount of ultrasonic energy is coupled into the air.

In one embodiment, a top electrode made of a silicon nitride membrane with some circular symmetry is used. The equation of motion for the center of a circular membrane is given by:

$$\rho \tau_n u'' + Zu' + \frac{4\tau_n \sigma_0}{a^2} u = \frac{\varepsilon_{\mathit{eff}}}{d_{\mathit{eff}}^2} V_0 V_1 \cos(\omega t) \qquad (6)$$

Where u is the displacement of the membrane at the center, $\rho$ is the membrane density, $\tau_n$ is the membrane thickness, Z is the acoustic impedance of the air, $\sigma_0$ is the residual stress in the membrane, a is the membrane radius, $\varepsilon_{\mathit{eff}}$ and $d_{\mathit{eff}}$ are the effective dielectric constant and spacing of the capacitor. The first term represents the inertial pressure, the second term represents the radiation loss due to acoustic coupling, and the third term represents the spring constant of the membrane. The right-hand side of the equation is the electromagnetic force on the center of the membrane. The solution to this equation at resonance is:

$$u = u_0 \cos(\omega_0 t) = \frac{\varepsilon_a \varepsilon_n V_0 V_1}{2(\tau_a + \tau_n)(\varepsilon_a \tau_n + \varepsilon_n \tau_a) Z \omega_0} \cos(\omega_0 t) \qquad (7)$$

Where $\varepsilon_a$ and $\tau_a$ are the dielectric constant and thickness of the air gap, and $\omega_0$ is the radian resonance frequency of the membrane given by $\omega_0 = 2/\sigma_0/\rho a^2$. The equation for the frequency dependence of the displacement is:

$$|u(\omega)| = \frac{Z \omega_0 u_0}{\sqrt{\rho^2 \tau^{2n}(\omega^2 - \omega_0^2)^2 + Z^2 \omega^2}} \cos(\omega t) \qquad (8)$$

Although this analysis is greatly simplified, it gives remarkably accurate results and insight into operation of the transducer. It is seen from the above analysis that transducers can be fabricated with selected characteristics by controlling the membrane material, the size of the membrane and the spacing between the membrane and substrate.

A 1 cm×1 cm transducer having a 500 Å gold film over a 7500 Å thick low residual stress nitride layer (280 MPas[6]) spaced 10,000 Å from the substrate with a 100 µm spacing between 3 µm dots etched to form 120 µm diameter diaphragms was tested; two different measurement systems were used. The first test system, shown in FIG. 8, is a traditional pitch-catch system. Ultrasonic waves are generated and received with two identical transducers.

The same system was also used with the two transducers facing each other. For a spacing of about 5 mm between transmitter and receiver, and a very short electrical pulse excitation, the impulse response shown in FIG. 9 was received. To Applicant's knowledge, this is the most broadband impulse response of an air transducer operation in this frequency range. The device was also quite efficient as a signal was able to be received with a spacing of 10 cm (about 44 dB propagation loss) between transmitter and receiver.

The second system used to measure the performance of the transducer was an optical interferometer capable of detecting sub-Å displacements. This system measures the displacement at one point on the surface of the membrane. FIG. 10 shows the measured displacement near one of the etch holes in the 100 µm period device. The very large displacements measured at resonance is indicative of the efficiency of the device in coupling ultrasonic energy into air. As important is the large displacement away from resonance, over a wide frequency range.

The acoustic power in a medium is given by:

$$P_{acoustic} = \frac{1}{2} Z A \omega^2 u_0^2 \quad (9)$$

where A is the active transducer area.

The efficiency of the device is calculated using the measured displacement and a correction for the distribution of the displacement over the membrane. The efficiency is also measured using the ultrasonic system of FIG. 8. The measured acoustic signal agrees well with a theory shown in FIG. 11.

The transducers were driven with 100 VDC bias and 15 VAC without dielectric breakdown in the gap. This corresponds to 640 $\mu$W of acoustic power. The breakdown voltage is at least 10 times larger than the breakdown of air. This is due to the small spacing between the electrodes. This effect is one of the main features in the design of the transducer of this invention. Larger vibrations might be limited by running into the silicon substrate. After four weeks of nearly continuous use in a dirty lab environment, all the transducers continued to work at the same efficiency.

Thus, there has been provided an electrostatic transducer fabricated by using a one-mask process and surface micromachining. Using a thin oxide sacrificial layer, an efficient broadband ultrasonic source has been obtained. The frequency of operation is easily adjustable by varying the etch time. By electrically isolating each membrane, an array of elements can be made. By using silicon as the substrate, receiving, processing and focusing electronics can be integrated with these devices, resulting in an inexpensive, light, small, efficient ultrasonic imaging system.

What is claimed:

1. The method of fabricating an electrostatic ultrasonic transducer array including a plurality of ultrasonic transducers each having spaced electrodes comprising the steps of:

providing a substrate of conductive silicon material;

forming a layer of silicon nitride on said substrate;

selectively etching the silicon nitride layer to form a support structure which exposes therebetween a shaped area of the surface of the substrate;

growing a silicon oxide layer on the exposed surface of the substrate between said support structure;

growing a membrane layer of low stress silicon nitride directly over such silicon oxide layer and silicon nitride support structure;

forming a metal layer on the surface of said silicon nitride layer;

forming openings in said metal layer and said silicon nitride membrane layer to expose the silicon oxide between the silicon nitride support structure; and etching away all of the silicon oxide to leave a silicon nitride membrane at shaped area supported above the substrate by the silicon nitride support structure.

* * * * *